(12) United States Patent
Sundet et al.

(10) Patent No.: US 7,503,953 B2
(45) Date of Patent: *Mar. 17, 2009

(54) SELF-SUPPORTING PLEATED FILTER

(75) Inventors: Douglas C. Sundet, Hudson, WI (US); James F. Pitzen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/735,135

(22) Filed: Apr. 13, 2007

(65) Prior Publication Data

US 2007/0180803 A1    Aug. 9, 2007

Related U.S. Application Data

(62) Division of application No. 10/322,889, filed on Dec. 18, 2002, now Pat. No. 7,217,333, which is a division of application No. 09/354,416, filed on Jul. 15, 1999, now Pat. No. 6,521,011.

(51) Int. Cl.
    *B01D 46/00* (2006.01)
(52) U.S. Cl. .............................. 55/499; 55/497; 55/502; 55/521; 55/DIG. 31
(58) Field of Classification Search .................. 55/499, 55/497, 500, 502, 521, DIG. 5, DIG. 31; 156/196, 210, 221, 223, 227, 250
    See application file for complete search history.

(56) References Cited

U.S. PATENT DOCUMENTS

| 30,782 | A | 11/1860 | Wright |
|---|---|---|---|
| 3,679,057 | A | 7/1972 | Perez |
| 3,712,033 | A | 1/1973 | Gronholz |
| 3,853,529 | A | 12/1974 | Boothe et al. |
| 3,941,571 | A | 3/1976 | Getzin |
| 4,199,387 | A | 4/1980 | Hladik |
| 4,210,067 | A | 7/1980 | Evans, Jr. |
| 4,547,950 | A | 10/1985 | Thompson |
| 4,678,578 | A | 7/1987 | Nodes et al. |
| 4,731,047 | A | 3/1988 | Lobb |
| 4,798,575 | A | 1/1989 | Siversson |

(Continued)

FOREIGN PATENT DOCUMENTS

DE        1 757 508        4/1971

(Continued)

*Primary Examiner*—Duane S Smith
*Assistant Examiner*—Minh-Chau T Pham
(74) *Attorney, Agent, or Firm*—David B. Patchett

(57) ABSTRACT

A self-supporting, pleated filter including a plurality of pleats in a filter media that extend along a front face and a rear face. The pleats include a plurality of pleat tips and sloping side surfaces generally perpendicular to the direction of pleating. At least one planar reinforcing strip oriented in the direction of pleating is bonded to the pleat tips on the front face. At least one reinforcing member is positioned along the rear face of the filter media. The reinforcing member may be a reinforcing strip oriented in the direction of pleating and bonded to the rear face of the filter media. A second planar reinforcing strip may optionally be bonded to the reinforcing strip pleat tips. The reinforcing member, the first reinforcing strip and the second reinforcing strip can be aligned to form a truss structure.

21 Claims, 5 Drawing Sheets

U.S. PATENT DOCUMENTS

| | | | |
|---|---|---|---|
| 4,817,942 A | | 4/1989 | Begon |
| 4,976,677 A | | 12/1990 | Siversson |
| 5,230,800 A | | 7/1993 | Nelson |
| 5,389,175 A | | 2/1995 | Wenz |
| 5,397,632 A | | 3/1995 | Murphy, Jr. et al. |
| 5,505,852 A | * | 4/1996 | van Rossen .............. 210/493.3 |
| 5,507,847 A | | 4/1996 | George et al. |
| 5,509,950 A | | 4/1996 | van de Graaf et al. |
| 5,512,075 A | | 4/1996 | Ninomiya et al. |
| 5,558,689 A | | 9/1996 | Yanagihara et al. |
| 5,597,645 A | | 1/1997 | Pike et al. |
| 5,618,324 A | * | 4/1997 | Sommer et al. ............... 55/497 |
| 5,704,953 A | | 1/1998 | Stemmer |
| 5,709,735 A | | 1/1998 | Midkiff et al. |
| 5,779,747 A | | 7/1998 | Schlör et al. |
| 5,782,944 A | | 7/1998 | Justice |
| 5,814,219 A | | 9/1998 | Friedmann et al. |
| 5,820,644 A | * | 10/1998 | Mori et al. ................. 55/385.3 |
| 5,836,861 A | | 11/1998 | Diaz |
| 5,868,889 A | | 2/1999 | Kähler |
| 6,000,685 A | | 12/1999 | Groten et al. |
| 6,039,779 A | * | 3/2000 | Butz et al. .................... 55/499 |
| 6,152,980 A | | 11/2000 | Culwell |
| 6,299,660 B1 | | 10/2001 | Pfeuffer et al. |
| 6,319,300 B1 | * | 11/2001 | Chen ........................... 55/497 |
| 6,521,011 B1 | * | 2/2003 | Sundet et al. ................. 55/499 |
| 7,156,891 B2 | * | 1/2007 | Winters et al. ................ 55/497 |
| 7,217,333 B2 | * | 5/2007 | Sundet et al. ............... 156/196 |
| 2003/0089091 A1 | * | 5/2003 | Sundet et al. ................. 55/499 |
| 2005/0150201 A1 | * | 7/2005 | Choi et al. .................... 55/499 |
| 2006/0283162 A1 | * | 12/2006 | Dent et al. .................... 55/521 |
| 2008/0066437 A1 | * | 3/2008 | Solberg et al. ................ 55/521 |
| 2008/0067121 A1 | * | 3/2008 | Ter Horst et al. ......... 210/493.1 |

FOREIGN PATENT DOCUMENTS

| | | |
|---|---|---|
| FR | 2 217 049 | 9/1974 |
| WO | WO 98/17368 | 4/1998 |

* cited by examiner

SELF-SUPPORTING PLEATED FILTER

CROSS REFERENCE TO RELATED APPLICATIONS

This application is a divisional application of U.S. application Ser. No. 10/322,889, filed Dec. 18, 2002, now U.S. Pat. No. 7,217,333, which is a divisional of U.S. application Ser. No. 09/354,416, filed Jul. 15, 1999, issued as U.S. Pat. No. 6,521,011, the disclosures of which are incorporated by reference in their entirety herein.

TECHNICAL FIELD

The present invention is directed to a method of making a self-supporting, pleated filter with reinforcing structures that resists pleat deformation, and in particular, to a fully automated method of making a pleated filter for air filtration.

BACKGROUND OF THE INVENTION

The surface area of filter media is a major factor in determining flow resistance (i.e., pressure drop) and loading capacity of a pleated filter. The surface area of a pleated filter media is determined by the size of the pleated filter, the depth of the pleats, and the pleat density. Since the external dimensions of pleated filters are often restricted by the particular application, the number of pleats per inch (pleats density) can be increased to improve filtration performance.

The ability of air filter media to withstand operating pressures is typically dependent upon the pleat count, the pleat depth and the stiffness of the filter media. The filter media can become unsteady when air pressure is applied to one side. In the event the pleats deform or collapse, a portion of the surface area can be reduced and the pressure drop across the filter element will increase, further increasing the force applied to the filter media.

U.S. Pat. No. 5,618,324 (Sommer et al.) discloses a self supporting, accordion folded filter element that includes a planar reinforcing strips bonded to the pleat tips by an adhesive.

A filter element available from Columbus Industries available under the product designation Microshield utilizes a glue bead to provide longitudinal stabilization. The glue bead is applied before the folding of the filter media and connects the folds with one another at the point of application. However, the glue beads require a large quantity of melt bonding agent, resulting in increased cost. Additionally, the glue beads require the pleats to be closely spaced limiting application of this technique to pleat counts generally greater than about six pleats per inch.

U.S. Pat. No. 4,547,950 (Thompson) discloses a method of spacing the folds of a pleated filter media using a tapered assembly comb having uniformly spaced teeth. Subsequently, a rigid divider is inserted into the separated and folded media to produce a uniformly spaced filter media. Thompson does not disclose automated filter element manufacturing.

Therefore, there is a need for an automated method of manufacturing a pleated filter that has good flow characteristics and exhibits sufficient stability so that the pleats do not collapse or deform when subjected to operating pressure.

SUMMARY OF THE INVENTION

The present invention is directed to a self-supporting, pleated filter for air filtration, and method of making the same. The method of the present invention provides for assembly of the pleated filter by an automated process at a high rate of manufacturing. The pleated filter of the present invention can be used with or without a reinforcing frame structure. The present method and apparatus may utilize conventional filter media, electret media, or a variety of other media suitable for air filtration, such for furnace applications.

In one embodiment, the method of making the self-supporting pleated filter includes forming a plurality of pleats in a filter media that extend along a front face and a rear face. The pleats include a plurality of pleat tips and sloping side surfaces generally perpendicular to the direction of pleating. At least one reinforcing strip oriented in the direction of pleating is bonded to the pleat tips on the front face to form a pleated filter. At least one reinforcing member is positioned along the rear face of the filter media. The filter media is then cut to size. Frame members are optionally applied for some filtration applications. Alternatively, the self-supporting pleated filter can be used without a frame or inserted into a permanent frame that permits the media to be easily changed.

In one embodiment, the step of positioning at least one reinforcing member includes locating one or more elongated reinforcing members oriented in the direction of pleating to the rear face of the filter media prior to the step of forming the plurality of pleats. A plurality of pleats are then formed in the reinforcing member during the step of forming the pleats in the filter media. The pleats formed in the reinforcing member define reinforcing member pleat tips. A second reinforcing strip may optionally be bonded to the reinforcing member pleat tips. In one embodiment, the reinforcing member, the first reinforcing strip and the second reinforcing strip are aligned to form a truss structure. The reinforcing member can optionally be bonded to the filter media.

In another embodiment, the plurality of reinforcing members oriented perpendicular to the direction of pleating are located on the rear face of the filter media prior to the step of forming the pleats. A plurality of pleats are formed in the reinforcing member during the step of forming the pleats in the media. A second reinforcing strip oriented in the direction of pleating may be bonded to the pleat tips of the rear face over the reinforcing member.

In another embodiment, the reinforcing member is inserted into the pleats on the rear face of the filter media after the pleats have been formed. At least one reinforcing member is positioned along at least one of the sloping side surfaces of the pleats on the rear face in a direction perpendicular to the direction of pleating. A second reinforcing strip oriented in the direction of pleating may optionally be bonded to the pleat tips on the rear face over the reinforcing member.

In another embodiment, a scrim is positioned along the rear face of the filter media. The scrim can be bonded to the pleat tips along the rear face. In one embodiment, a portion of the frame members extend over a perimeter of the scrim to secure it to the pleated filter. A scrim refers to a porous mesh, netting or screen. The scrim can be constructed from various metals, plastics or paper-based products.

In another embodiment, a scrim can be substituted for the reinforcing strips located along the front face. The scrim is bonded to the pleat tips on the front face to form a pleated filter. Any of the reinforcing members disclosed herein can be used along the rear face of the pleated filter.

The present method may also include the step of heat setting one or more of the filter media and the reinforcing members after forming the pleats. The step of applying the frame members typically includes positioning a portion of the frame members onto a portion of the front face and the rear face of the filter media. An adhesive is typically applied between the perimeter of the filter media and the frame members. The present method may be performed using a fully automated system. The reinforcing members and reinforcing strips may be constructed from various paperboard products, polymeric materials such as films, or metals configured as elongated strips, scrims, strands or filaments.

The present invention is also directed to a self-supporting pleated filter. The filter media has a plurality of pleats defining a plurality of pleat tips and sloping side surfaces extending along a front face and a rear face. The pleat tips extend perpendicular to a direction of pleating. A planar reinforcing strip oriented in the direction of pleating is bonded to the pleat tips along the front face of the pleated filter. A reinforcing structure is provided along the rear face of the pleated filter. A frame optionally extends around the perimeter of the filter media. In another embodiment, the pleated filter may be inserted into, and subsequently removed from, a reusable frame.

In one embodiment, the reinforcing structure includes one or more reinforcing members extending in the direction of pleating generally along the contour of the pleat tips and sloping side surfaces of the rear face. In one embodiment, the reinforcing, members are bonded to the filter media. A generally planar second reinforcing strip oriented in the direction of pleating is bonded to reinforcing member pleat tips on the pleated reinforcing member. In one embodiment, the reinforcing member, the first reinforcing strip and the second reinforcing strip are positioned to define a truss structure.

In another embodiment, the reinforcing structure includes at least one reinforcing member oriented perpendicular to the direction of pleating that is positioned generally along at least one of the sloping side surfaces of the rear face. In one embodiment, the frame extends over distal ends of the reinforcing member. The reinforcing member may also be bonded to the filter media.

In another embodiment, the reinforcing structure includes a scrim that extends over the rear face of the pleated filter. In one embodiment, a portion of the frame extends over a perimeter of the scrim and onto the rear face of the filter media.

In another embodiment, a scrim is substituted for the reinforcing strip located along the front face. The scrim is bonded to the pleat tips on the front face to form a pleated filter. Any of the reinforcing members disclosed herein can be used along the rear face of the pleated filter.

DETAILED DESCRIPTION OF THE INVENTION

Figure 1:
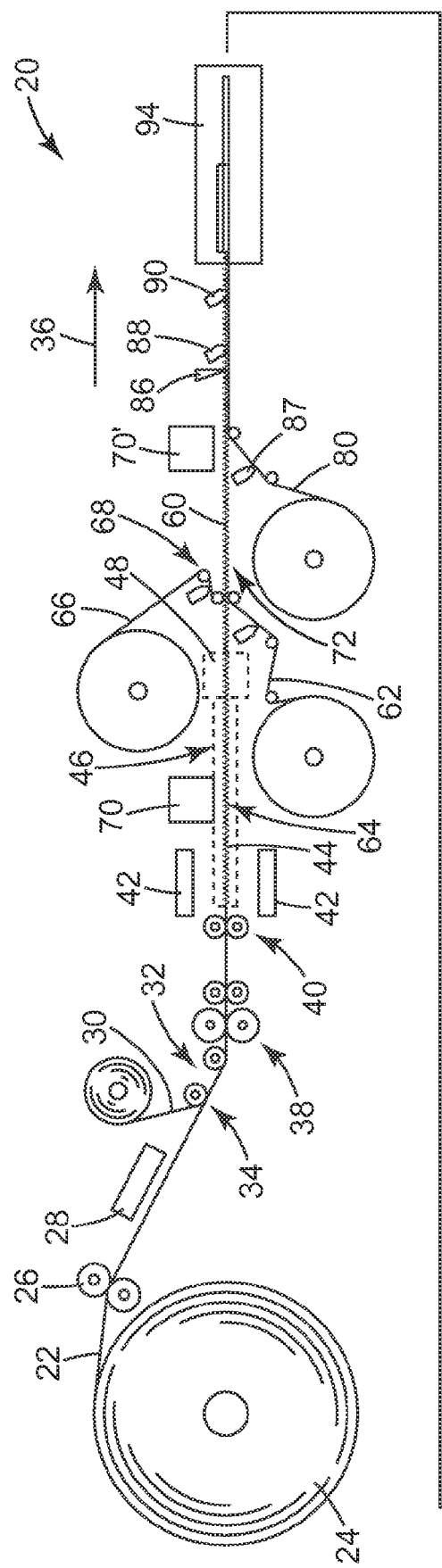
FIG. 1 is a schematic illustration of a system for performing the method of the present invention.
Figure 1:
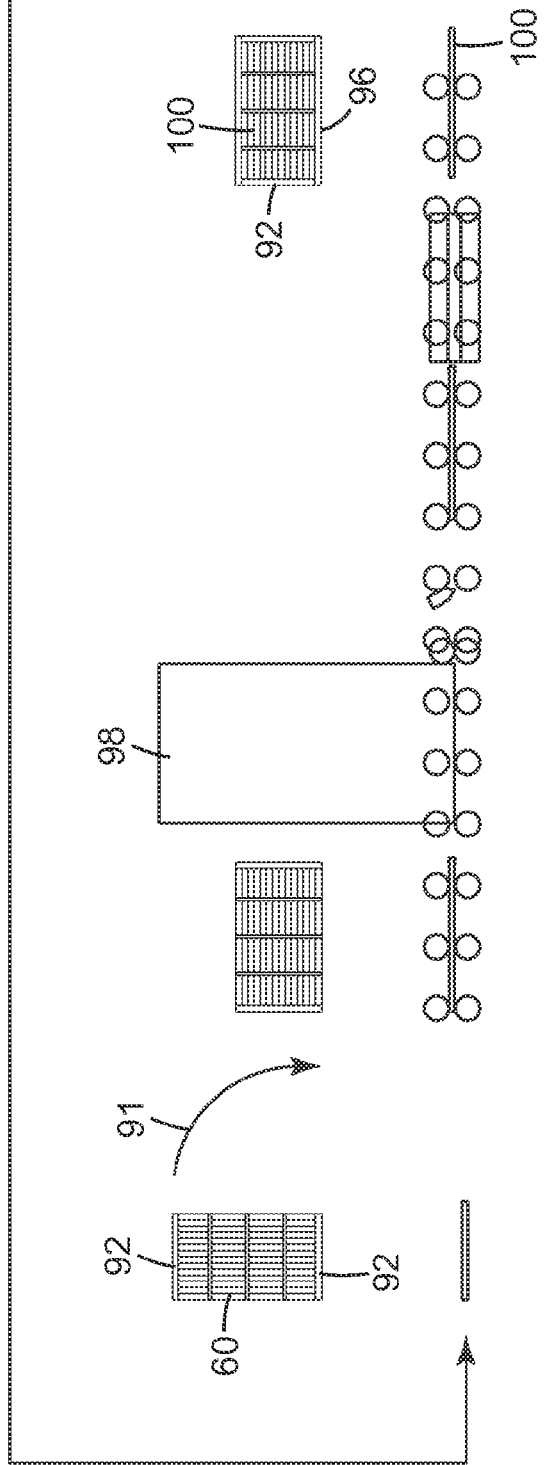

FIG. 1 is a schematic illustration of a system 20 for performing the method of the present invention. Filter media 22 is typically provided on a continuous roll 24. The media 22 may be slit to the desired width at slitting station 26. The media 22 may optionally be preheated at a heating station 28 to facilitate processing. In the illustrated embodiment, the heating station 28 is an infrared heater.

In one embodiment, a reinforcing member 30 is applied to a rear face 32 of the media 22 at a location 34. As will be discussed in detail below, the reinforcing member 30 may be applied as one or more continuous strips oriented in the direction of pleating 36, as discrete reinforcing members oriented perpendicular to the direction of pleating 36, or a variety of other configurations. The reinforcing member 30 may optionally be bonded to the media 22 using a variety of techniques, such as adhesive bonding, thermal bonding, solvent bonding, or ultrasonic bonding. In this embodiment, the location 34 is upstream of rotary-score pleater 38 that scores the media 22 and the reinforcing member 30 prior to pleating. The rotary-score pleater 38 and pleat folding station 40 may be modified to accommodate the increased thickness in the filter media 22 at the location of the reinforcing member 30.

The assembly of the media 22 and the reinforcing member 30 is advanced through the rotary-score pleater 38 to a pleat folding station 40. Infrared heaters 42 may optionally be provided for heat-setting the pleats 44. The pleats 44 are retained in an accumulator 46 until being advanced to a pleat spacing device 48 that retains the pleats 44 in the desired pleat spacing. Pleat formation and pleat spacing may be performed by a variety of methods, such as disclosed in U.S. Pat. No. 4,798,575 (Siversson); U.S. Pat. No. 4,976,677 (Siversson) and U.S. Pat. No. 5,389,175 (Wenz).

The pleated filter media 60 is expanded to the desired pleat spacing in the pleat spacing device 48. One or more elongated, planar reinforcing strips 62 are applied to the pleat tips along the front face 64 at the station 68 to maintain the pleat spacing. The reinforcing strips 62 can be bonded to the pleat tips by various techniques, such as adhesive bonding, thermal bonding, solvent bonding, or ultrasonic bonding. The pleated filter media 60 and the reinforcing strip 62 define a pleated filter 72 that can be cut, machined handled or otherwise processed. The reinforcing strips 62 provide dimensional stability to the pleats 44 of the pleated filter 72. The pleated filter 72 can be used in filtration applications, with or without a frame structure, or as an insert into a permanent/reusable frame.

In another embodiment, a scrim 62 extending substantially across the entire front face 64 is substituted for the planar reinforcing strips 62. The scrim is bonded to the pleat tips to provide dimensional stability to the pleated filter 72. Use of a scrim 62 extending across the front face 64 may be used in combination with any of the reinforcing members discussed herein.

In the illustrated embodiment, one or more elongated planar reinforcing strips 66 are optionally bonded to the rear face 32 of the pleated filter media 60 at the station 68. In one embodiment, the reinforcing strips 66 are located over the reinforcing member 30 and opposite the reinforcing strips 62 to form truss structures (see FIG. 6).

In one embodiment, a continuous strip of frame material 80 is applied to the ends of the pleated filter media 60 parallel to the direction of pleating 36. An adhesive, such as a hot melt adhesive, is applied to a first flange of a U-shaped channel formed from the frame material 80 at the station 87. The adhesive for sealing the ends of the pleats 44 is applied at station 88. A hot melt adhesive is applied to the second flange of the U-shaped channel at station 90. The frame material 80 is bent into its U-shaped configuration at station 94. The ends U-shaped channel extend partially onto the front face 64 and rear face 32 of the pleated filter media 60 (see FIG. 5). An assembly including the endless web of pleated filter media 60 and attached frame material 80 is cut at station 86 to desired lengths. Alternatively, the pleated filter comprising the pleated filter media 60 and the reinforcing strips 62 can be cut to size before application of the frame material 80.

The pleated filter media 60 and side frames members 92 are rotated 90° at location 91 to permit application of the end frame members 96 at a station 98. Alternatively, the frame members 92, 96 can be configured as two box structures that are positioned over the first and second faces 32, 64, respectively, of the pleated filter 72, with overlapped circumferential portions, such as disclosed in U.S. Pat. No. 5,782,944 (Justice). In another embodiment, the frame member members 92, 96 can be configured as a one-sided die-cut frame that is folded around the pleated filter 72.

Figure 2:
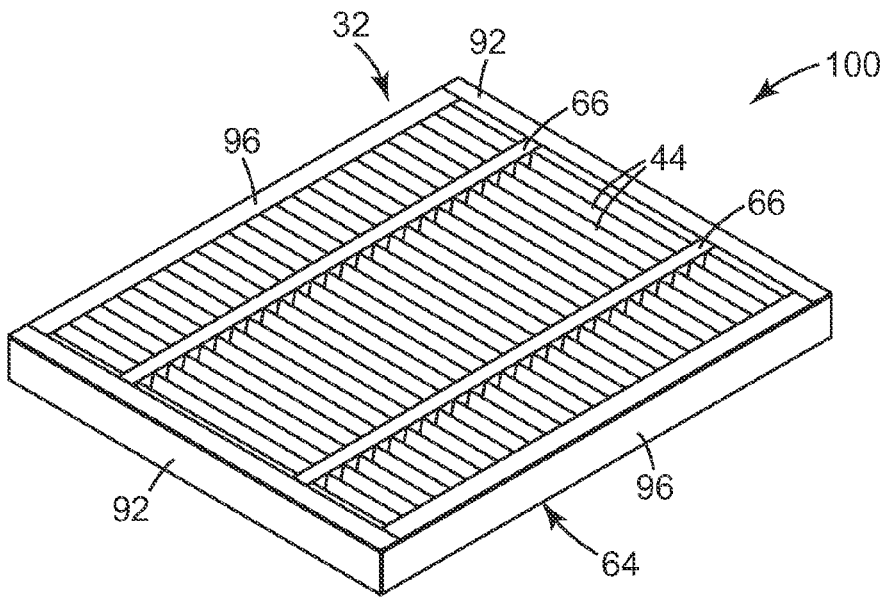
FIG. 2 is a perspective of a self-supporting pleated filter in accordance with the present invention.

In embodiments where the pleated filter media 60 is used without frame members 92, 96, the pleated filter 72 exits the system 20 after the cutting station 86. Alternatively, a pleated filter 100 with a frame (see FIG. 2) exits the system 20. The pleated filters 72, 100 are typically enclosed in suitable packaging.

Pleat spacing is typically about 3 to about 6 pleats per 2.54 centimeters (1 inch), Pleat depth and the thickness of the filter 100 is typically about 2.54 centimeters to about 101.6 centimeters (1 inch to 4 inches). For HVAC applications, the length and width of the filter 100 is typically 30.5 centimeters×30.5 centimeters (12 inches×12 inches) to about 50.8 centimeters×76.2 centimeters (20 inches×30 inches). Reference to the front face 64 or rear face 32 is for purposes of description only and does not indicate an orientation of the pleated filter 100. For example, the reinforcing member 30 may be positioned upstream or downstream in the air flow.

The resulting pleated filter 100 in accordance with the present invention is self-supporting. A pleated filter is self-supporting as defined herein when the portion of the pleats 44 that are not directly supported by the reinforcing member 30 or the reinforcing strips 62, 66 do not collapse or bow excessively when subjected to the air pressure typically encountered in forced air ventilation systems.

Stiffness of the filter media 22 is a factor in determining the suitability of a particular filter media for use in the present invention. A Taber V-5 Stiffness Tester, Model 150-B, made by Teledyne Taber of North Tonawanda, N.Y. can be used to evaluate the stiffness of the filter media. The V-5 stiffness tester operates by bending a specimen about 38.1 millimeters wide by about 38.1 millimeters long (1.5 inches by 1.5 inches) to a prescribed angular of deflection and measuring the force, in stiffness units ranging from 0-10, used to obtain this deflection. In many heating ventilating and air conditioning (HVAC) applications, the air pressure is generally about 125 Pa to about 249.1 Pa (0.5 to 1.0 inch column of water) and the face velocity is approximately 91.5 meters per minute (300 feet per minute). For HVAC filtration applications, the minimum stiffness value is greater than about 1.2 stiffness units, and preferably greater than about 1.5 stiffness units and more preferably greater than about 2 stiffness units.

The U-shaped channel of the side frame members 92 serve to further stabilize the pleated filter media 60 and to seal the ends of the pleats 44 to prevent air bypass in the final pleated filter 100. In one embodiment, a viscous adhesive such as a foamed adhesive, a filled adhesive or a caulk is used to seal the ends of the pleats 44 to the frame members 92, 96. Latex caulk is well suited for this purpose since it is low cost and has low volatile organic content. On the other hand, latex caulks have a long set time. Therefore, other adhesives, such as hot melt adhesives, are utilized to bond the two sides of the U-shaped channel formed from the frame material 80 to the pleat tips 44. A variety of techniques may be used for applying the frame members 92, 96 to the pleated filter, such as disclosed in U.S. Pat. No. 4,731,047 (Lobb).

Figure 3:
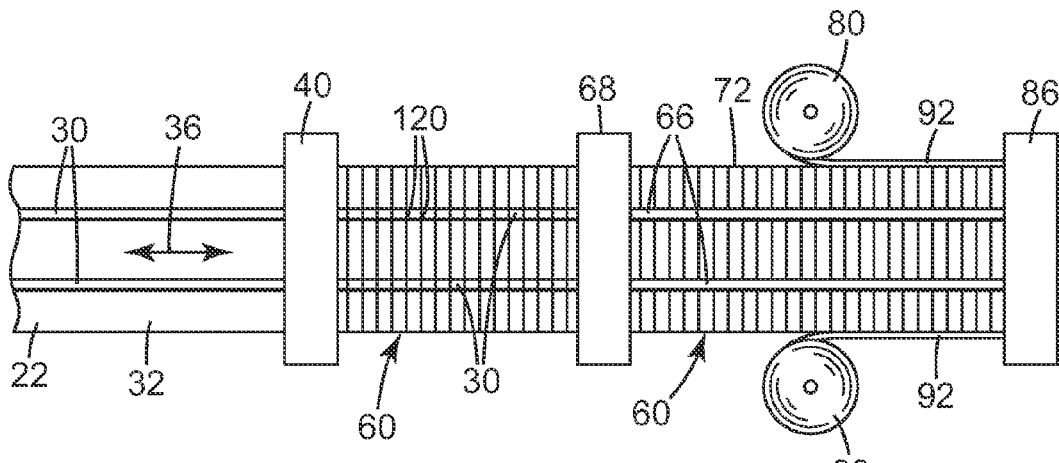
FIG. 3 is a top schematic illustration of one embodiment of the method of the present invention.

FIG. 3 is a top schematic illustration of one embodiment of the present method for making a self-supporting pleated filter. The reinforcing member 30 is oriented in the direction of pleating 36 along the rear 32. In one embodiment, the reinforcing member 30 is bonded to the filter media 22. In the illustrated embodiment, the reinforcing member 30 is strips about 0.64 centimeters to about 2.54 centimeters subject to a pleating operation at station 40, resulting in pleats being formed in the reinforcing members 30. The pleated reinforcing members 30 include reinforcing member pleat tips 120.

The reinforcing strip 62 is applied to the front face 64 of the pleated filter media 60 at the station 68 to form the pleated filter 72 (see FIG. 1). The reinforcing strip 66 is also bonded to the reinforcing member pleat tips 120 at the station 68. The reinforcing strips 62, 66 provide added dimensional stability to the pleated filter media 60 to facilitate machine handling. Frame material 80 is optionally applied to the edges of the pleated filter media 60 parallel to the direction of pleating 36 to form side frame members 92, as previously discussed. The combination of the pleated reinforcing member 30, the reinforcing strips 66 along the rear face 32 and the reinforcing strip 62 along the front face form a truss structure that gives the pleated filter media 60 its self-supporting properties (see FIG. 6). The pleated filter media 60 and frame material 80 are cut to length at the cutting station 86. Alternatively, the pleated filter 72 can be cut to size prior to application of the frame material 80.

Figure 4:
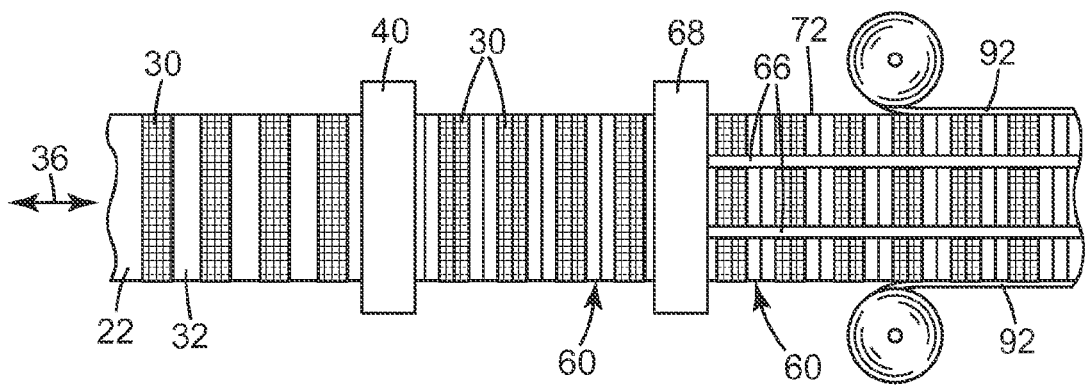
FIG. 4 is a top schematic illustration of an alternate method in accordance with the present invention.

FIG. 4 is a top schematic illustration of an alternate method in accordance with the present invention. The reinforcing member 30 is applied to the media 22 at discrete locations along the rear surface 32 perpendicular to the direction of pleating 36. The reinforcing member 30 may optionally be bonded to the filter media 22. The assembly of the filter media 22 and the reinforcing member 30 is subject to the pleating operation at the station 40 so that the reinforcing member 30 is simultaneously pleated with the filter media 22.

The reinforcing strip 62 is applied to the front face 64 of the pleated filter media 60 at the station 68 to form the pleated filter 72 (see FIG. 1). Reinforcing strips 66 are optionally applied to the pleat tips along the rear face 32 at the station 68. In the embodiment illustrated in FIG. 4, the side frame members 92 preferably extend onto the rear face 32 of the pleated filter media 60 so that stresses imposed on the reinforcing members 30 are transmitted to the frame members 92.

Turning back to FIG. 1, the reinforcing member 30 may optionally be inserted directly into the pleated filter media 60 at a station 70. The reinforcing member 30 can be preformed to correspond to the pleat tips and sloping side surfaces of the pleats 44 (see FIG. 7). The reinforcing member 30 may optionally be bonded to the pleated filter media 60. In one embodiment, the station 70 is located upstream of the station 68 where the reinforcing strip 66 is applied to the rear face 32. In this embodiment, the reinforcing strip 66 helps to retain the reinforcing member 31 to the pleated filter media 60. Alternatively, the reinforcing member 30 may be inserted into the pleats of the pleated filter media 60 at station 70' located downstream of the station 68.

The reinforcing member 30 may be a scrim extending across the rear face 32 prior to forming the frame members 92, 96. The stations 70 or 70' may be used to position a scrim along the rear face 32. The scrim may optionally be adhesively bonded to the pleated filter media 60. In this embodiment, the reinforcing strip 62 will be applied to the front face 64 to maintain pleat spacing and facilitate machine handling, but the reinforcing strip 66 along the rear face 32 may be unnecessary.

The filter media 22 may be paper, porous films of thermoplastic or thermoset materials, nonwoven webs of synthetic or natural fibers, scrims, woven or knitted materials, foams, or electret or electrostatically charged materials. The filter media 22 may also include sorbents, catalysts, and/or activated carbon (granules, fibers, fabric, and molded shapes). Electret filter webs can be formed of the split fibrillated charged fibers as described in U.S. Pat. No. RE 30,782. These charged fibers can be formed into a woven web by conventional means and optionally joined to a supporting scrim such as disclosed in U.S. Pat. No. 5,230,800 forming an outer support layer. Alternatively, the filter media 22 can be a melt blown microfiber nonwoven web, such as disclosed in U.S. Pat. No. 4,817,942 which can be joined to a support layer during web formation as disclosed in that patent, or subsequently joined to a support web in any conventional manner. The reinforcing member 30 and the reinforcing strips 62, 66 may be constructed from various paper products, polymeric materials, or metals. These materials can be configured as strips, films, scrims, strands or filaments. The frame members are typically paper products, such as chipboard, or polymeric materials.

Figure 5:
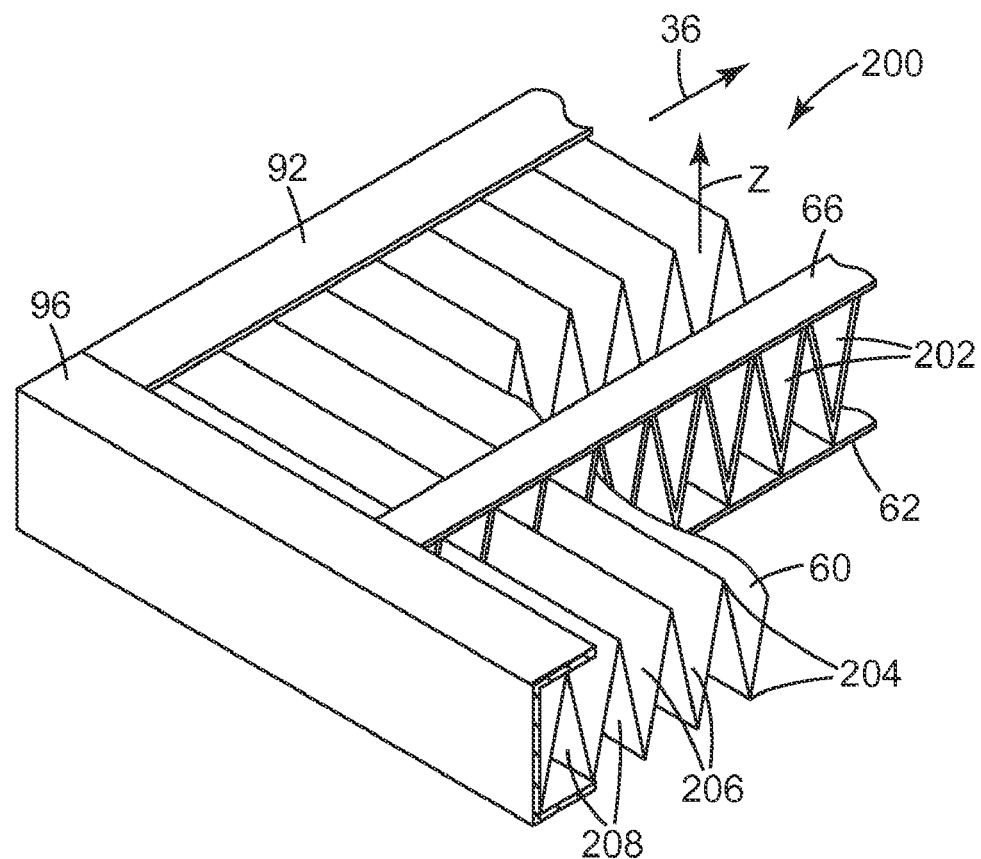
FIG. 5 is a sectional view of a self-supporting pleated filter in accordance with the present invention.
Figure 6:
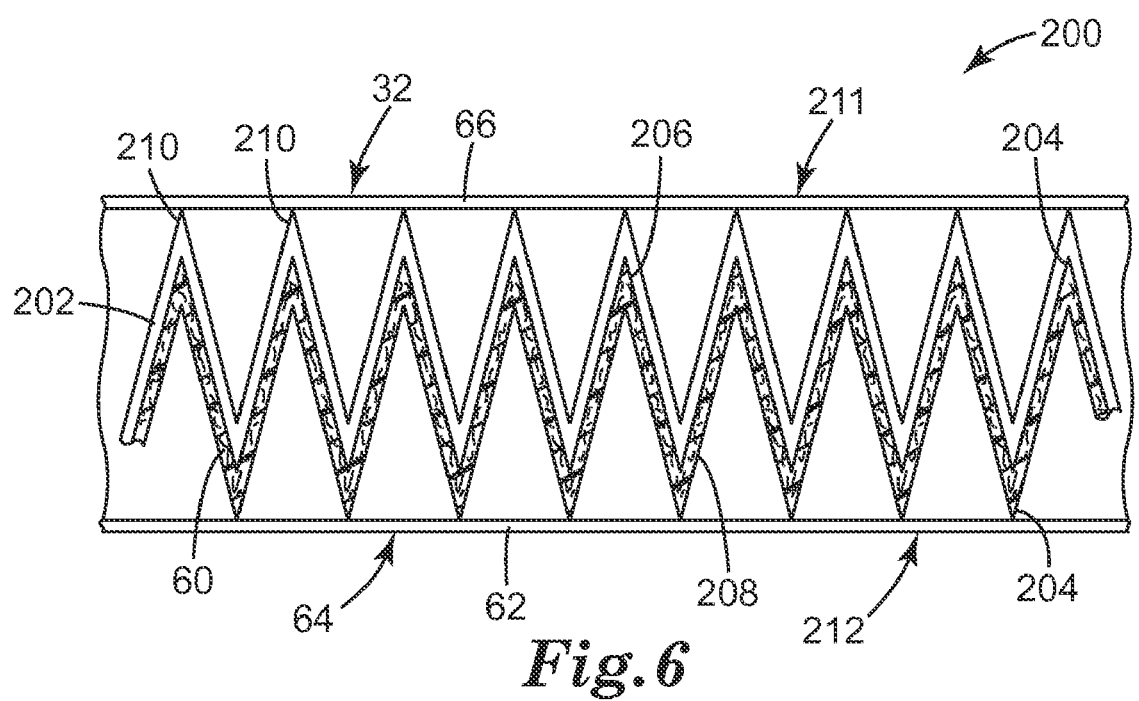
FIG. 6 is a side sectional view of the pleated filter of FIG. 5.

FIGS. 5 and 6 illustrate a self-supporting pleated filter 200 that corresponds with the method illustrated in FIG. 3. The pleated filter media 60 is retained within a pair of opposing side frame members 92 and end frame members 96, The reinforcing member 30 of FIG. 3 corresponds generally to the reinforcing member 202 that extends in the direction of pleating 36 and generally follows the contour of the pleat tips 204 and sloping side surfaces 206, 208. That is, the reinforcing member 202 extends into the pleats along the z-axis. The z-axis is the axis perpendicular to a plane defined by the front face 64 or the rear face 32 of the pleated filter media 60. The reinforcing member 202 has a plurality of reinforcing member pleat tips 210. Reinforcing strip 66 is optionally bonded to the reinforcing member pleat tips 210 along the rear face 211. Reinforcing strip 62 is oriented in the direction of pleating 36 and bonded to the pleat tips 204 along the front face 212 and opposite the reinforcing member 202 to form a truss structure.

Figure 7:
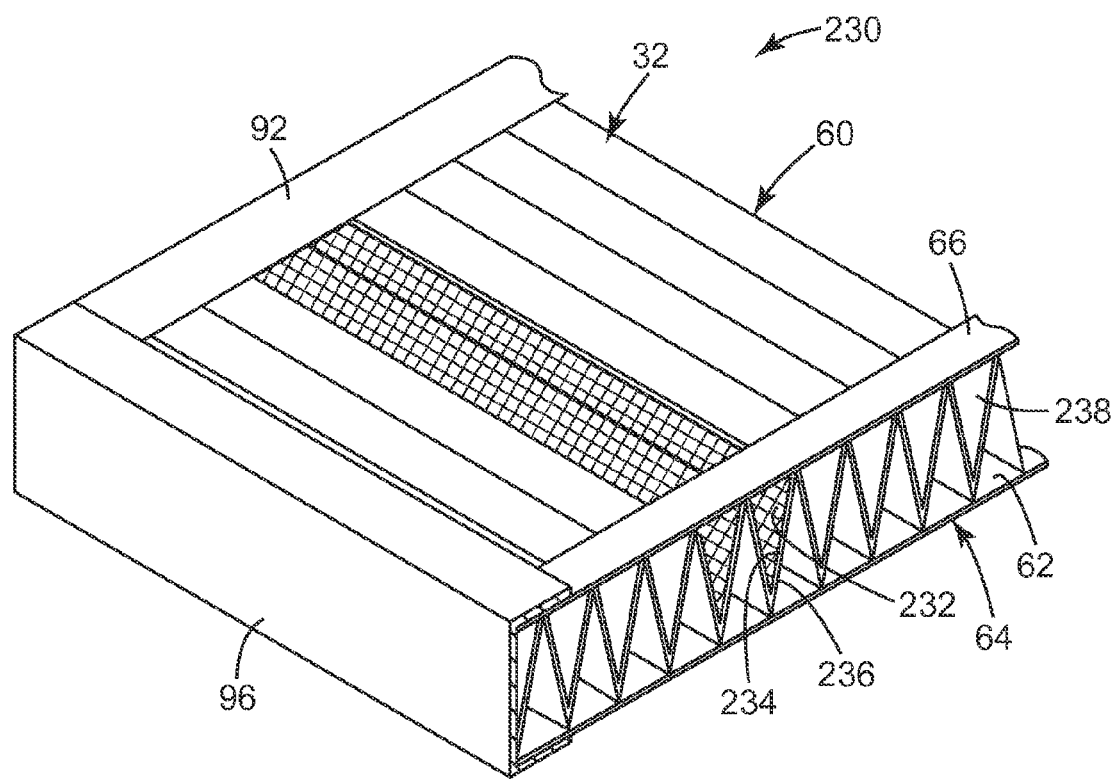
FIG. 7 is a side sectional view of an alternate reinforcing member in accordance with the present invention.

FIG. 7 is a perspective view of an alternate self-supporting pleated filter 230 that corresponds generally to the method illustrated in FIG. 4. The reinforcing member 30 corresponds generally to the reinforcing member 232. The reinforcing member 232 extends into pleats along the z-axis, perpendicular to the rear face 32. The reinforcing member 232 can be bonded to the pleated filter media 60, retained by the side frame members 92, or a combination thereof. The reinforcing strip 66 may optionally be provided along the rear face 32. In the illustrated embodiment, the reinforcing member 232 has a V-shape that extends along a pair of opposing side surfaces 234, 236 of two pleats 238. In an alternate embodiment, the reinforcing structure 232 extends across a single pleat. In one embodiment, the reinforcing member 232 is a metal scrim.

Figure 8:
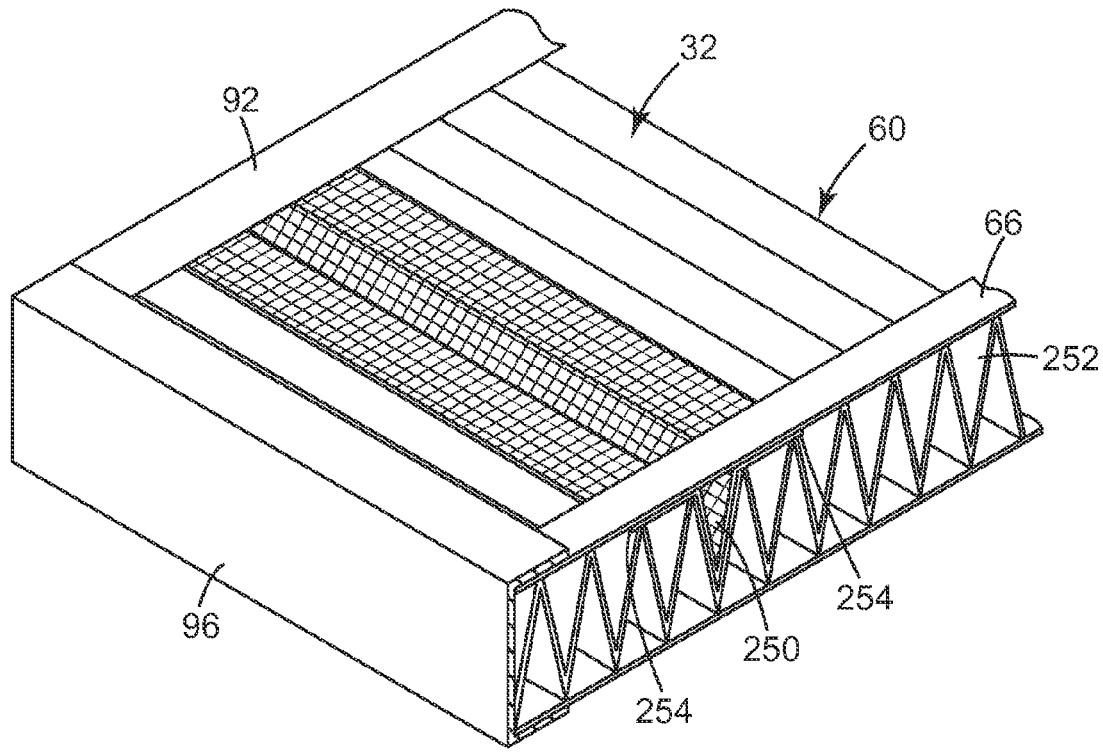
FIG. 8 is a side sectional view of an alternate reinforcing member in accordance with the present invention.

FIG. 8 illustrates an alternate reinforcing structure 250 that is deposited in the pleats 252, rather than being pleated with the filter media 60. The reinforcing structure 250 is typically inserted into the pleats 252 of the pleated filter media 60 prior to application of the optional reinforcing strip 66. In the embodiment illustrated in FIG. 8, the reinforcing structure 250 extends along a single pleat 252 and includes side extensions 254 that extend parallel to the rear face 32 over additional pleats. In order to minimize pressure drop across the pleated filter media 60, the reinforcing structure 250 is a porous material, such as a scrim. The reinforcing structure 250 may be retained to the pleated filter media 60 by bonding, by the optional reinforcing strip 66 and/or by the side frame members 92. In an alternate embodiment, the reinforcing structure 250 has a triangular shape corresponding to the shape of the pleats 252.

Figure 9:
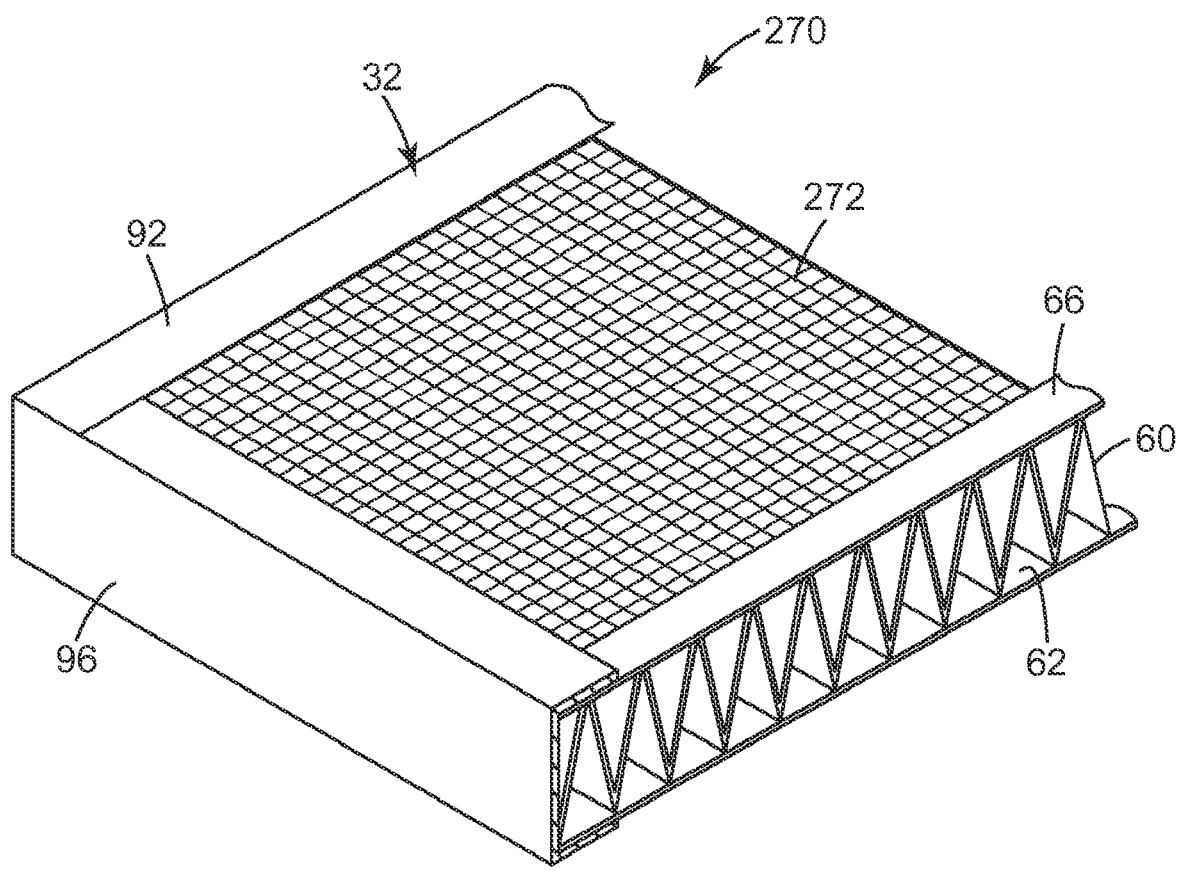
FIG. 9 is a side sectional view of an alternate reinforcing member in accordance with the present invention.

FIG. 9 illustrates an alternate pleated filter 270 with a continuous reinforcing structure 272 extending across the rear surface 32 of the filter media 60. Reinforcing strips 62 are located along the front face 64 (see FIG. 1) Reinforcing strip 66 is optionally provided on the rear face 32 over or under the reinforcing structure 272. The reinforcing structure 272 may be retained to the pleated filter media 60 by bonding to the frame members 92, 96 and/or the filter media 60, by the optional reinforcing strip 66 and/or by the side frame members 92. The continuous reinforcing structure 272 may be a scrim, mesh, screen or other porous material. In an alternate embodiment, the continuous reinforcing structure 272 is bonded to the pleat tips along the front face 64 in place of the reinforcing strips 62.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A self-supporting, pleated filter, comprising:
   a filter media defining a front face and a rear face, and having a plurality of pleats defining a plurality of pleat tips oriented perpendicular to a direction of pleating;
   a reinforcing structure surrounding the filter media, the reinforcing structure comprising:
   a frame including a U-shaped channel disposed about a periphery of the filter media, wherein first ends of the U-shaped channel extend partially over the front face of the filter media and second ends of the U-shaped channel extend partially over the rear face of the filter media,
   a first generally planar scrim adhered to a portion of the pleat tips along the front face and secured between the filter media and the first ends of the U-shaped channel,
   a secondary generally planar scrim adhered to a portion of the pleat tips along the rear face and secured between the filter media and the second ends of the U-shaped channel;
   wherein the pleats are self-supporting in regions not directly supported by the scrims.

2. The article of claim 1 wherein each of the scrims are constructed from paper products, metals, polymeric materials, or combinations thereof.

3. The article of claim 1 wherein respective ends of the U-shaped channel are adhesively bonded to a corresponding one of the scrims.

4. The article of claim 1 wherein a perimeter of the filter media is adhesively bonded to the frame.

5. The article of claim 1 wherein the U-shaped channel and the scrims combine to comprise a truss structure.

6. The article of claim 1 wherein the filter media comprises about 3 to about 6 pleats per 2.54 centimeters (1 inch).

7. The article of claim 1 wherein the pleats have a depth of about 2.54 centimeters to about 10.16 centimeters (1 inch to 4 inches).

8. The article of claim 1 wherein the filter media has a stiffness of at least 1.2 stiffness units.

9. The article of claim 1 wherein the filter media has a stiffness of at least 1.5 stiffness units.

10. The article of claim 1, wherein the frame is delivered by two overlapping box structures that are coupled together to extend around a perimeter of the filter media.

11. The article of claim 1 wherein the first and second scrims each extend over an entirety of a respective side of the filter media.

12. The article of claim 1 wherein the filter media is electrostatically charged.

13. The article of claim 12 wherein the electrostatically charged filter media comprises a fibrillated fiber.

14. The article of claim 12 wherein the electrostatically charged filter media comprises melt blown microfibers.

15. A self-supporting, pleated filter, comprising:
a filter media defining a perimeter, the filter media being pleated to define a plurality of pleat tips and sloping side surfaces extending along a front face and a rear face; and
a reinforcing truss surrounding the filter media, the truss comprising:
a frame disposed around the perimeter of the filter media,
a first scrim adhered to a portion of the pleat tips along the front face and wherein the first scrim defines a planar portion and at least one generally triangular portion extending from the planar portion between adjacent front face pleat tips and along the corresponding sloping side surfaces between the adjacent front face pleat tips,
a second scrim adhered to a portion of the pleat tips along the rear face and wherein the second scrim defines a planar portion and at least one generally triangular portion extending from the planar portion of the second scrim between adjacent rear face pleat tips and along the corresponding sloping side surfaces between the adjacent rear face pleat tips;
wherein the filter media is self-supporting in regions not directly contacting the truss.

16. The article of claim 15 wherein the scrims are constructed from paper products, metals, polymeric materials, or combinations thereof.

17. The article of claim 15 wherein the frame forms a U-shaped channel defined by opposing ends, the channel ends extending over peripheral ends of the scrims.

18. The article of claim 15 wherein the frame is adhesively bonded to the perimeter of the filter media.

19. A self-supporting, pleated filter, comprising:
a filter media having a plurality of pleats defining a plurality of pleat tips and sloping side surfaces extending along a front face and rear face; and
a reinforcing structure comprising:
a frame adhered to a perimeter of the filter media,
a generally planar first screen bonded to a portion of the pleat tips across the front face and the frame,
a generally planar second screen bonded to a portion of the pleat tips across the rear face and the frame;
wherein the filter media is self-supporting in regions not directly in contact with the reinforcing structure.

20. The article of claim 19 wherein the frame defines a U-shaped channel that defines opposing channel ends, the channel ends extending over a portion of the filter media and peripheral ends of the first and second screens.

21. The article of claim 19 wherein the frame is adhered to ends of the plurality of pleats and configured to maintain a pleat spacing of about 3 to about 6 pleats per inch.

* * * * *

UNITED STATES PATENT AND TRADEMARK OFFICE
CERTIFICATE OF CORRECTION

PATENT NO. : 7,503,953 B2 Page 1 of 1
APPLICATION NO. : 11/735135
DATED : March 17, 2009
INVENTOR(S) : Douglas C. Sundet et al.

It is certified that error appears in the above-identified patent and that said Letters Patent is hereby corrected as shown below:

Column 1
Line 28, Delete "pleats" and insert -- pleat --, therefor.

Column 3
Line 23, Delete "reinforcing," and insert -- reinforcing --, therefor.

Column 6
Line 12, After "rear" insert -- face --.
Line 15, After "centimeters" second occurrence insert -- (0.25 inches to about 1 inch). The filter media 22 and reinforcing member 30 are --.

Column 7
Line 51, After "into" insert -- the --.

Column 9
Line 8, In Claim 10, delete "delivered" and insert -- defined --, therefor.

Signed and Sealed this

Eleventh Day of August, 2009

David J. Kappos
*Director of the United States Patent and Trademark Office*